United States Patent [19]

Steinhilber

[11] Patent Number: 5,439,307
[45] Date of Patent: Aug. 8, 1995

[54] APPARATUS FOR REMOVABLY ATTACHING AND OBJECT TO A SUPPORT SURFACE

[76] Inventor: Helmut Steinhilber, Sonnenbergstrasse 40, CH-6052 Hergiswil, Switzerland

[21] Appl. No.: 128,699

[22] Filed: Sep. 30, 1993

[30] Foreign Application Priority Data

Oct. 14, 1992 [DE] Germany .......... 42 34 552.9
Oct. 14, 1992 [DE] Germany .......... 92 13 834.9

[51] Int. Cl.$^6$ ........................... F16B 47/00
[52] U.S. Cl. ........................ 403/267; 403/41; 403/182; 248/309.1; 248/220.2
[58] Field of Search ........ 403/267, 266, 265, 407.1, 403/41, 167, 168, 182, 180; 248/309.1, 205.3, 205.4, 220.2, 223.4

[56] References Cited

U.S. PATENT DOCUMENTS

| 3,499,102 | 3/1970 | Gillemot et al. | 248/205.3 X |
| 3,848,843 | 11/1974 | Levy | 248/223.4 |
| 4,942,071 | 7/1990 | Frye | 248/205.3 X |
| 5,014,946 | 5/1991 | Gruber | 248/205.3 X |
| 5,282,427 | 2/1994 | Steinhilber . | |
| 5,295,755 | 3/1994 | DeHaan, III et al. | 403/266 X |

FOREIGN PATENT DOCUMENTS

2551609 8/1976 Germany .
2328084 8/1978 Germany .

*Primary Examiner*—Randolph A. Reese
*Assistant Examiner*—Harry C. Kim
*Attorney, Agent, or Firm*—Nath, Amberly & Associates; Irvin A. Lavine

[57] ABSTRACT

For fixing a rigid plate (10) on a fixing surface (12), a pad (18) mounted on the fixing surface (12) through the agency of a flat adhesive joint (20) is disposed in a cavity (14) on the underside of the plate (10). The pad (18) is joined at its centroid to the plate (10). Thereby a tilting moment acting on the plate (10) is transformed into a lifting force acting on the pad (18) in a direction perpendicular to the adhesive joint (20).

15 Claims, 3 Drawing Sheets

APPARATUS FOR REMOVABLY ATTACHING AND OBJECT TO A SUPPORT SURFACE

BACKGROUND OF THE INVENTION

This invention relates to an apparatus for removabley attaching a rigid plate to a support surface.

In a large number of the most diverse applications, it is necessary to mount a rigid plate on a support surface. This support surface can be a surface of a machine, an instrument, a piece of furniture, a building wall or the like. The plate can be used in particular for mounting anchoring fixtures, instrument parts, furniture items, etc. Depending on the application, the apparatus for attaching the plate to the support surface must be capable of absorbing varying loads.

In the case of sufficiently smooth support surfaces such as support surfaces of metal, glass, plastic, ground stone, wood, etc., flat adhesive joints have proved suitable. If a rigid plate is bonded flatly to the support surface, the adhesive joint usually has very high bonding resistance to being lifted perpendicularly from the support surface. If a tilting load acts on the plate, one edge of the plate is strongly pulled away from the fixing surface, while the opposite edge of the plate is braced as a tipping edge against the support surface. Particularly in the case of large and prolonged tilting loads, this can lead to gradual detachment of the adhesive joint, starting along the plate edge opposite the tipping edge. The long-time strength of the adhesive joint subjected to such tilting loads depends substantially on the creep characteristics of the adhesive. The worst creep tends to occur with adhesives of the type that do not impair the support surface and that if necessary can be removed from the support surface again without leaving traces.

One application of this attaching technique is the attaching of top-mounted items on a horizontal furniture top. Such top-mounted items are frequently exposed to considerable tilting loads, especially if they have a certain height. For example, it is known from a practical example of FIG. 8 of European Patent 0 457 957 A1 to which Steinhilber U.S. Pat. No. 5,282,427 corresponds how to mount a horizontal plate on the bottom end of a support post, this plate being placed flat on the surface of a desk top and fixed thereto by a stick-on hook and loop textile fastener. With this structure retrofitting of any type of writing desks and workbenches is possible by using a vertical support post. The vertical support post is suitable for holding various functional elements, for example the platform of a raised work stand, of a monitor holder, of a telephone arm or the like.

The attaching of the plate on the surface of the furniture top has the advantage compared with conventional clamping fixtures that the attaching structure is independent of the form of the furniture top and of the furniture. In particular, this type of attaching device can be used with furniture tops of any thickness and any edge shape, and even with furniture tops that do not project beyond the furniture body. Since the plate does not project beyond the border of the furniture top, the device for attaching the support post does not make it impossible to place the piece of furniture flush against another piece of furniture or against a room wall. The plate together with the support post can be removed from the surface of the furniture top without damaging the furniture top. For this purpose, the rigid plate is first separated in the region of the stick-on fastener. The portion of the stick-on fastener bonded to the furniture top can then be separated from the furniture top. Since this portion is flexible, it can be detached carefully from the surface of the furniture top without damaging that surface. This would be difficult if the rigid plate were bonded directly to the surface of the furniture top. This known apparatus for attaching the support column with a plate placed on the furniture top, especially a desk top, and joined thereto by a stick-on textile fastener, has proved eminently suitable.

If a tilting load is exerted by the support post on the plate, one edge of the plate will be pulled strongly away from the furniture surface in this case also, while the opposite edge of the plate will be braced as a tipping edge against the furniture top. Particularly during large and prolonged tilting loads, this can lead to gradual loosening of the stick-on fastener, starting along the plate edge opposite the tipping edge.

SUMMARY OF THE INVENTION

The invention is based on the concept of not bonding the rigid plate directly to the support surface, but instead providing a pad for the adhesive joint, with which pad the plate is joined such that a tilting moment acting on the plate is transformed to a lifting force acting on the pad. If a tilting load acts on the plate, the plate becomes braced with one tipping edge on the fixing surface and generates a tensile force acting on the pad and directed perpendicularly away from the fixing surface. The adhesive joint has high bonding resistance to such a lifting force directed perpendicular to the surface of the adhesive joint. Even if a removable adhesive with corresponding creep characteristics is used, high loadability of the removable attaching apparatus is achieved therewith, especially during long-time loading.

If the plate must absorb tilting loads in all tilting directions, the joint between the pad and the plate is located at the centroid of the pad, so that the plate can be tilted relative to the pad with two degrees of freedom in any direction. However, situations also exist in which the fixed plate is subjected to a load only in one particular tilting direction. This is the case, for example, when the plate is fixed to a vertical wall and loaded only by the weight of an article mounted on or suspended from the plate. In these cases, the pad can be joined to the plate along a mirror-symmetry axis perpendicular to the plate of the tilting movement. Only a tilting moment with one degree of freedom around this mirror-symmetry axis can be absorbed in the manner according to the invention. In this case also a tensile load acting on the pad in the mirror-symmetry axis produces only a lifting force perpendicular to the surface of the adhesive joint.

If the intention is to fix the plate permanently to the fixing surface, the pad can be bonded directly to the fixing surface. In many applications, however, the means by which the plate is fixed to the fixing surface must be capable of being loosened if necessary. In these cases it is advantageous for the joint between plate and pad to be separable. If the plate must be removed from the fixing surface, the rigid plate can be separated from the pad first, in order to make the pad accessible. Once the pad has been made freely accessible, the flat adhesive joint between the pad and the fixing surface can be loosened more easily, since it is now no longer necessary to lift the entire area perpendicularly up from the fixing surface, but instead the pad can be peeled off starting from its border. The bonding resistance of the adhesive joint to peeling load is much smaller than to lifting up of the entire area.

To be able to separate the adhesive joint between the pad and the fixing surface by peeling, the pad can be provided with a certain elastic compliance. In this way it is possible, starting from the border of the pad, to lift the pad from the fixing surface and peel it off along a moving parting line.

In one advantageous embodiment of the invention, the detachment process is facilitated by a flexible adhesive-coated film, the adhesive side of which is in contact with the fixing surface and a nonadhesive side of which is attached detachably to the pad. In this embodiment the pad can be a completely rigid structure, thus reliably ensuring that the only way in which the pad can be lifted up from the fixing surface is simultaneously over the entire area of its adhesive joint. Once the rigid pad has been separated from the adhesive-coated film, the flexibility of this film allows it to be pulled away from the fixing surface relatively easily, even if a strongly adhering adhesive is used.

For detachable attachment of the adhesive-coated film to the pad, it is preferable to use an interlocking joint of pad and adhesive-coated film. It is also possible to attach the adhesive-coated film to the pad by means of a hook-and-loop fastener (stick-on self-clinging fastener).

A preferred application of the invention is to fix top-mounted items to a horizontal furniture surface, e.g., to a desk surface. Such top-mounted items may be raised work stands, monitor holders, telephone arms, vision-protection screens, rack flanges, desk lamps, etc. According to the invention, existing workbenches can be retrofitted with such top-mounted items. A further advantage is that the top-mounted items can also be removed again or changed without damaging or disfiguring the furniture surface.

BRIEF DESCRIPTION OF THE DRAWINGS

The invention will be explained in more detail in the following by reference to practical examples illustrated in the drawing, wherein.

DESCRIPTION OF THE PREFERRED EMBODIMENTS

Figure 1:
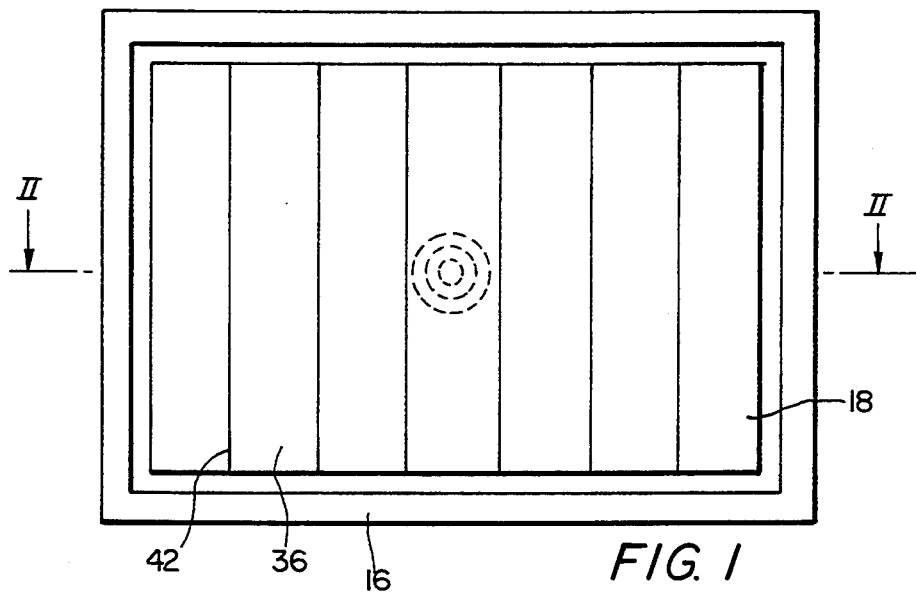
FIG. 1 shows a view of the plate from below.

In the practical example of FIGS. 1 to 4, the apparatus of the invention comprises a rigid plate 10 generally to a parallel support surface 12 illustrated. The rigid plate 10 has, for example, rectangular shape, and may be a cast metal or plastic plate. The plate 10 is used in particular as an attaching element for mounting any kind of parts on the support surface 12. These parts mounted on the plate 10 may have any desired configuration and therefore are not illustrated.

The underside of plate 10 facing the support surface 12 has a shallow cavity 14. To obtain an adhesive joint over the largest possible area, the cavity 14 extends over a large area and preferably leaves only a peripheral transversely extending border 16 around the underside of the plate 10. A pad 18 is inserted into the cavity 14 and substantially fills the area of the cavity 14, thus permitting a large-area adhesive joint. The underside of the pad 18 is fixed to the support surface 12 by means of a flat adhesive joint 20. The border 16 of the plate 10 rests on the fixing surface 12.

At the centroid of the pad 18, i.e., at the intersection of the diagonals in the case of the illustrated pad 18 of rectangular shape, the pad 18 is provided on its top side with a raised portion 22. At the centroid, a threaded hole 24 is made in the pad 18 at the center of the raised portion 22. The plate 10 has a perforation 26 axially aligned with the threaded hole 24. On the top side of the plate 10, the perforation 26 is widened by a hollow 28 having the form of a spherical cup. A bolt 30 is inserted from above into the plate 10, passed through the perforation 26 and screwed into the threaded hole 24 to thereby connect the plate 10 and pad 0. The bolt 30 has a head rounded in the form of a spherical cup at its underside on the shank side, so that it forms a ball joint together with the hollow 28. This ball joint consisting of bolt 30 and hollow 28 provides a swivel bearing between plate 10 and pad 18, allowing slight mutual tilting of plate 10 and pad 18 in any direction.

At its underside facing the fixing surface 12, the pad 18 has a recess 32 running transversely over the entire width of the pad 18. Angle pieces 34 bent over at right angles are molded onto the pad 18 in such a way that they run parallel to each other over the entire width in this recess 32. The pad 18 with the recess 32 and the angle pieces 34 is preferably an extruded section of aluminum or other material that provides the pad 18 with adequate stiffness.

Figure 4:
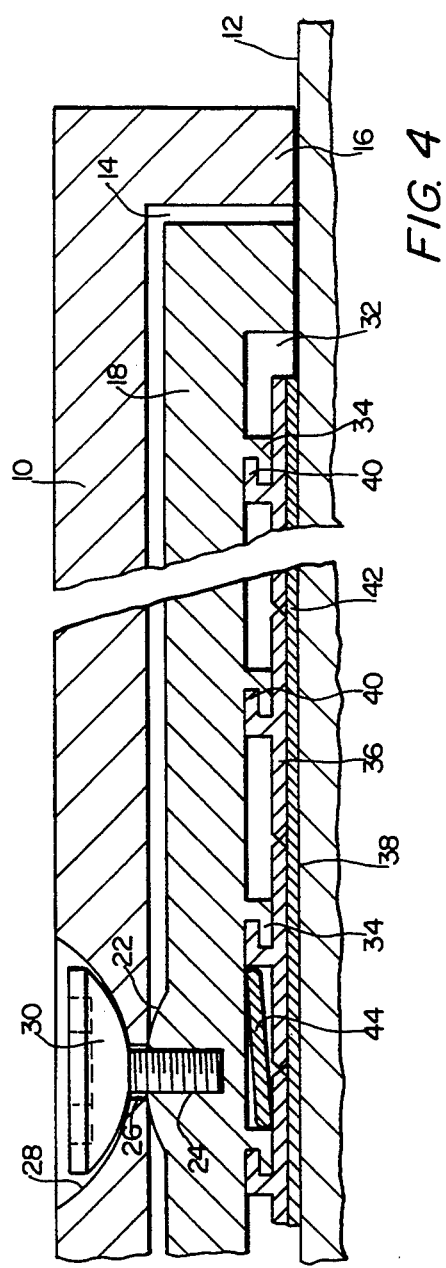
FIG. 4 shows a partial section corresponding to FIG. 2 on an enlarged scale and FIG. 5 shows a top view of the plate in a second embodiment.

The adhesive joint 20 is established by an adhesive-coated film or body 36. The body 36 is an extruded flexible plastic film, the dimensions of which correspond substantially to the dimensions of the recess 32. The body 36 is coated on its underside with an adhesive 38, which has good bonding strength to the support surface 12 but can be detached from the support surface 12 without leaving traces. The body 36 is provided on its top with angle pieces 40 corresponding in number, spacing and form to the angle pieces 34 of the pad 18. However, the angle pieces 40 of the body 36 are directed oppositely with respect to the angle pieces 34 of the pad 18, so that the angle pieces 34 and 40 can interlock, as is shown in FIG. 4, in order to join the body 36 and the pad 18 positively with each other to prevent lifting off perpendicular to the plane of the fixing surface 12. The body 36 is further provided between the angle pieces 40 with specified break lines 42 of reduced material thickness, also running over the entire width.

In a modified embodiment, the angle pieces 34 of the pad 18 can also be formed by a plastic film corresponding to the body 36, which plastic film is bonded into the recess 32 of the pad 18.

Figure 2:
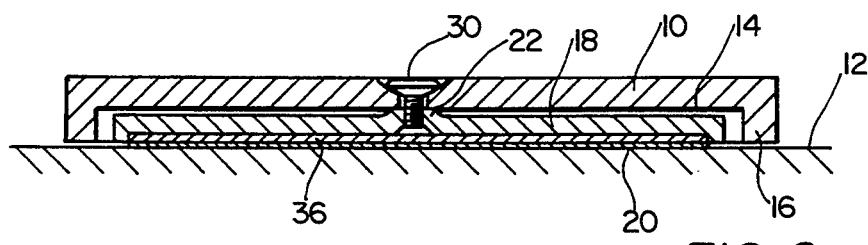
FIG. 2 shows a section through the fixing means along line II—II in FIG. 1.
Figure 2A:
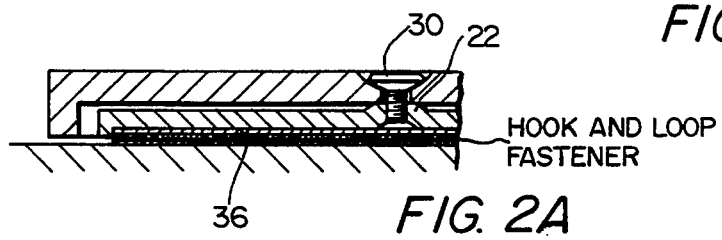
FIG. 2A is a section similar to FIG. 2, with parts removed, showing a hook and loop fastener connection.
Figure 3:
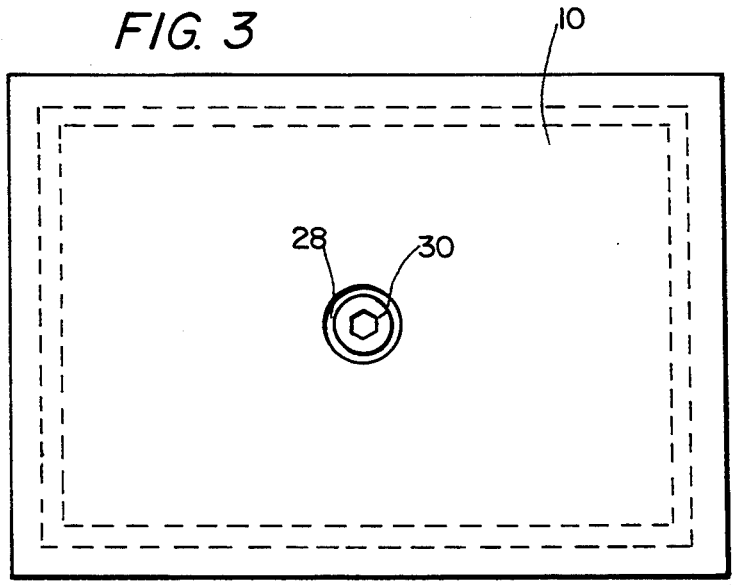
FIG. 3 shows a top view of the plate.

FIG. 2A is a cross-sectional view similar to FIG. 2, with parts removed, and showing a hook and loop fastener for connecting the pad 18 and the body 36.

The manner in which the apparatus functions will be explained below.

Firstly the body 36 is bonded to the support surface 10 by means of the adhesive 38. The pad 18 is placed on the body 36 in such a way that the angle pieces 34 of the pad 18 (at the right in FIG. 4) sit next to the angle pieces 40 on the body 36. The pad 18 is then pushed relative to the body 36 (to the left in FIG. 4) such that the angle pieces 34 and 40 interlock with each other in the manner shown in FIG. 4. Thereafter a locking bar 44 is pushed into one of the cavities between the body 36 and the pad 18. The width of the locking bar 44 is such that the locking bar is braced with one longitudinal edge against an angle piece 34 of the pad 18 and with the other longitudinal edge against an angle piece 40 of the body 36. The locking bar 44 prevents the pad 18 from being able to shift again relative to the body 36 and causing the angle pieces 34 and 40 to become disengaged.

The pad 18 is now firmly secured on the fixing surface 12 by means of the body 36.

The plate 10 is now placed on the pad 18 and fixed to the pad 18 by the bolt 30. In the process, the bolt 30 is screwed sufficiently far into the pad 18 that the plate 10 is seated firmly with its border 16 on the support surface 12. The swivel joint formed between the plate 10 and the pad 18 by the ball joint consisting of bolt 30 and hollow 28 facilitates complete seating of the plate 10 along its entire periphery. The raised portion 22 on the top side of the pad 18 is used as a stop between pad 18 and plate 10 and ensures that, as the bolt 30 is tightened, the pad 18 cannot be pulled so far into the cavity 14 that the adhesive joint 20 between pad 18 and support surface 12 is stressed as a result.

If a tilting moment acts on the plate 10, the plate 10 is pressed against the support surface 12 with that side of its border 16 toward which the tilting moment is directed. The tilting moment tends to lift the plate 10 up from the support surface 12, the edge of the border 16 being pressed against the support surface 12 and acting as a tipping edge. Through the agency of the bolt 30, the tilting moment acting on the plate 10 exerts a tensile force on the pad 18. Since the bolt 30 is located at the centroid of the pad 18, this tensile force acts as a lifting force on the pad 18, this force being directed perpendicular to the adhesive joint 20. The adhesive joint 20 has its maximum bonding resistance to such a lifting force directed perpendicular to the plane of the support surface 12.

If the plate 10 must be detached from the support surface 12, the bolt 30 is first unscrewed so that the plate 10 can be removed from the pad 18. Thereafter the locking bar 44 is withdrawn. Now the pad 18 can be pushed laterally to the body 36 once again, so that the angle pieces 34 and 40 become disengaged and the pad 18 can be removed. Now only the body 36 continues to adhere to the fixing surface 12. Because of its flexibility, the body 36 can now be pulled relatively easily from the fixing surface 12. The removal of the body 36 is made easier by the fact that its flexibility allows it to be peeled off along a moving parting line, the bonding resistance of the adhesive joint 20 to peeling being much weaker than to lifting off over the full area. The peeling of the body 36 is further favored by the specified break lines 42, since the body 36 tears along these specified break lines 42 during the removal process and can be pulled off in narrow strips.

Figure 5:
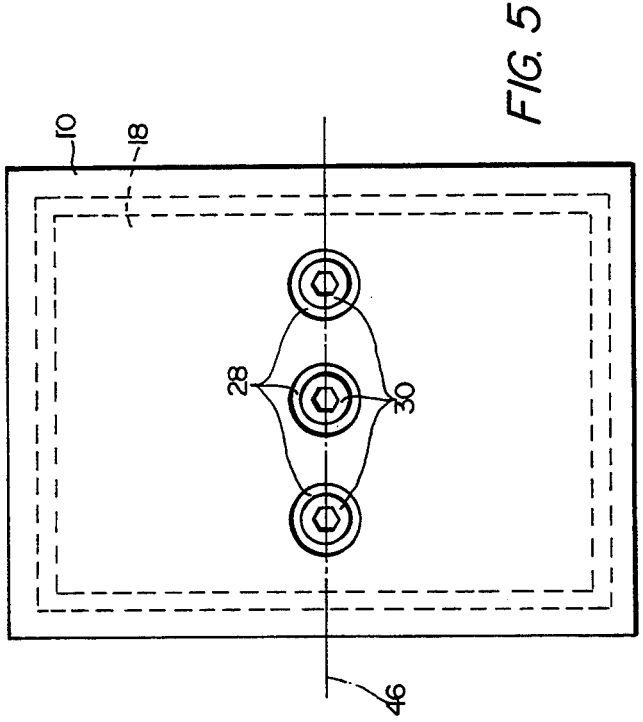

FIG. 5 shows an alaternate embodiment in which the plate 10 is mounted on a vertical support surface 12 and only one tilting moment acts on the plate 10, this tilting moment being caused by the weight of an article mounted on the plate 10.

In this embodiment, a plurality of joining points disposed on the horizontal mirror-symmetry axis 46 of the pad 18 can be are provided between the plate 10 and the pad 18.

If the tilting moment caused by gravity acts on the plate 10 in this embodiment, a tilting moment is developed around the lower horizontal edge of the plate 10. This tilting moment causes a tensile force that acts on the pad 18 along the mirror-symmetry axis 46. Since the pad 18 is areally centered with respect to this mirror-symmetry axis 46, even this tensile force generates only a lifting force perpendicular to the support surface 12.

This embodiment, which otherwise is identical to the embodiment of FIGS. 1 to 4, obviously does not have the advantageous high bonding resistance to tilting moments acting in the direction of the mirror-symmetry axis 46.

Figure 6:
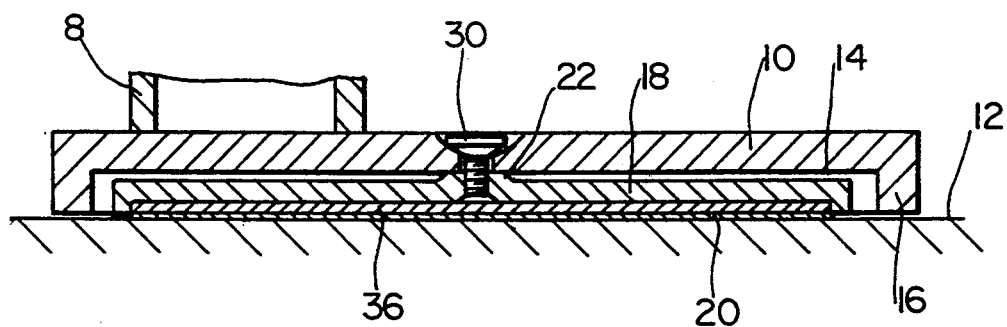
FIG. 6 is a cross-section, corresponding to FIG. 2, of the means of fixing a vertical support post to a furniture surface
Figure 7:
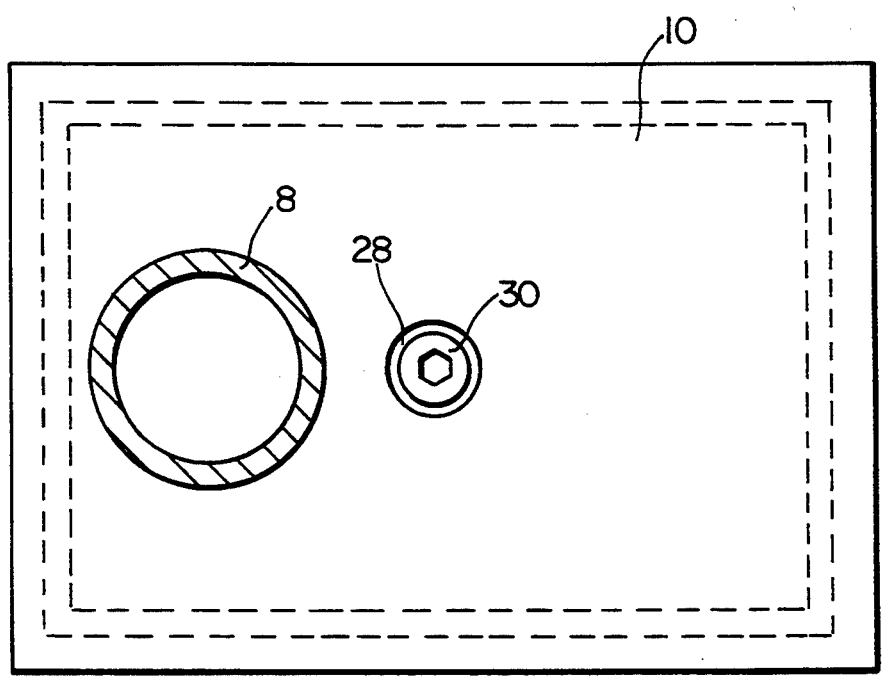
FIG. 7 shows a top view, corresponding to FIG. 3, of the fixing means of FIG. 6.

FIGS. 6 and 7 illustrate how the support according to the invention is used to attach a vertical support post 8 for a raised work stand, a monitor holder, a desk lamp, a telephone arm of the like as retrofitted and removable items on a horizontal furniture surface. The support post 8, which is preferably a metal tube, for example, is provided at its bottom end with the rigid plate 10, which will be fixed in the manner described above on the furniture surface forming the support surface 12.

I claim:

1. Apparatus for removably attaching a rigid plate, with an object attached thereto, to a support surface comprising:
    (a) said rigid plate having a transverse extension engageable with said support surface and providing a cavity, said extension having an edge at said support surface;
    (b) a pad in the cavity of said rigid plate having a central region;
    (c) a connector joining the central region of said pad to said plate;
    (d) a body in said cavity having a surface thereof facing said pad and a surface thereof remote from said pad;
    (e) said body having adhesive on said remote surface thereof; and
    (f) means for connecting said pad to said body; whereby, said connector joining said central region of said pad to said plate and said means for connecting said pad to said body causes substantially only a lifting force on said pad and body perpendicular to said remote surface when said plate is subjected to a force tending to tilt said plate about said edge thereof.

2. Apparatus according to claim 1, wherein said pad has a centroid, said connecter joining said pad at its centroid to the plate.

3. Apparatus according to claim 1, wherein the pad has at least one mirror-symmetry axis, and said connector joins said plate along said mirror-symmetry axis.

4. Apparatus according to claim 1, wherein said connector is a detachable connector for detachably joining the plate and the pad.

5. Apparatus according to claim 4, wherein said connector is a threaded coupling element.

6. Apparatus according to claim 5, and further comprising a stop on said pad remote from said body engaging said plate for limiting the movement of the pad in the cavity.

7. Apparatus according to claim 1, wherein said connector, pad and plate are shaped to permit swiveling movement of said pad relative to said plate.

8. Apparatus according to claim 1, wherein said adhesive comprises means for permitting detachment and reattachment of said body to said support surface without soiling or damaging said support surface.

9. Apparatus according to claim 1, wherein said body is flexible to enable removal of said body by peeling action.

10. Apparatus according to claim 1, wherein said connecting means comprises elements enabling said pad and body to be interlockingly attached to each other.

11. Apparatus according to claim 1, wherein said connecting means comprises interlocking elements on said pad and said body permitting separation thereof by relative parallel movement and preventing separation by a force generally perpendicular to said pad and body.

12. Apparatus according to claim 11, wherein said interlocking elements are of L-shape.

13. Apparatus according to claim 1, wherein said connecting means comprises a hook-and-loop fastener.

14. Apparatus according to claim 1, and further comprising a linear support element extending from said rigid plate opposite said cavity.

15. Apparatus for removably attaching a rigid plate, with an object attached thereto to a support surface comprising:
 (a) said rigid plate having a transverse extension engageable with said support surface and providing a cavity, said extension having an edge at said support surface;
 (b) a pad in the cavity of said rigid plate having a central region;
 (c) a connector joining the central region of said pad to said plate;
 (d) a body in said cavity having a surface thereof facing said pad and a surface thereof remote from said pad;
 (e) said body having adhesive on said remote surface thereof; and
 (f) means for connecting said pad to said body for transmitting to said body a force imparted to said central region of said pad by said connector from said plate, which force is substantially perpendicular to said support surface,
whereby when said plate is subjected to a force tending to tilt said plate about said edge, there will be applied on said pad and body a force perpendicular to said remote surface.

* * * * *